US007680798B2

(12) United States Patent
Jennings, III et al.

(10) Patent No.: US 7,680,798 B2
(45) Date of Patent: Mar. 16, 2010

(54) METHOD, DEVICE AND SYSTEM FOR AUTOMATIC RETRIEVAL OF SIMILAR OBJECTS IN A NETWORK OF DEVICES

(75) Inventors: Raymond B. Jennings, III, Ossining, NY (US); Martin G. Kienzle, Briarcliff Manor, NY (US); Jason D. LaVoie, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 532 days.

(21) Appl. No.: 10/993,785

(22) Filed: Nov. 20, 2004

(65) Prior Publication Data
US 2006/0112148 A1 May 25, 2006

(51) Int. Cl.
*G06F 17/30* (2006.01)
(52) U.S. Cl. ......................................... 707/10; 707/201
(58) Field of Classification Search ................... 707/3, 707/6, 10
See application file for complete search history.

(56) References Cited

U.S. PATENT DOCUMENTS

| 6,643,652 | B2* | 11/2003 | Helgeson et al. ............... 707/10 |
| 6,701,313 | B1* | 3/2004 | Smith ............................. 707/6 |
| 7,188,254 | B2* | 3/2007 | Somin et al. ................. 713/185 |
| 2003/1001475 | * | 1/2003 | Van Stam ..................... 725/97 |
| 2004/0181511 | A1 | 9/2004 | Xu et al. ......................... 707/3 |
| 2005/0198299 | A1* | 9/2005 | Beck et al. .................. 709/226 |
| 2005/0210043 | A1* | 9/2005 | Manasse ..................... 707/100 |
| 2006/0004914 | A1* | 1/2006 | Kelly et al. .................. 709/219 |
| 2006/0080356 | A1* | 4/2006 | Burges et al. ........... 707/103 R |
| 2006/0085561 | A1* | 4/2006 | Manasse et al. ............. 709/247 |

FOREIGN PATENT DOCUMENTS

WO    WO 01/46843 A2    6/2001

OTHER PUBLICATIONS

Ying Zhu et al., *Integrating Semantics-Based Access Mechanisms with P2P File Systems*, Proc. Of the 3rd Int'l. Conference on Peer-to-Peer Computing, Piscataway, New Jersey, Sep. 1, 2003, IEEE, pp. 118-125.
Ling, Bo., et al., *A Content-Based Resource Location Mechanism in PeerIS*, Proc. Of the 3rd Int'l. Conference on Peer-to-Peer Computing, Piscataway, New Jersey, Sep. 1, 2003, pp. 279-288.
Written Opinion for Int'l Appln. No. PCT/EP2005/055712, Int'l. Filing date of Nov. 2, 2005.
International Search Report for Int'l. Appln. No. PCT/EP2005/055712, Int'l. Filing date of Nov. 2, 2005.

* cited by examiner

*Primary Examiner*—Don Wong
*Assistant Examiner*—Belinda Xue
(74) *Attorney, Agent, or Firm*—F. Chau & Associates, LLC

(57) ABSTRACT

A method, device and system for characterizing an image sharing objects within a network. The method steps include initiating a query for a query object on a first device connected to a network of devices. Finding a similar object similar to the query object on a second device connected to the network of devices, wherein the similarity is automatically judged by any device on the network. Transferring the similar object from the second device to the first device.

12 Claims, 7 Drawing Sheets

METHOD, DEVICE AND SYSTEM FOR AUTOMATIC RETRIEVAL OF SIMILAR OBJECTS IN A NETWORK OF DEVICES

BACKGROUND OF THE INVENTION

1. Technical Field

The present invention relates to network processing and, in particular searching for and retrieving objects such as files on networked computers.

2. Description of Related Art

When a user wishes to obtain a shared object (e.g. a file) from an unknown location on the network (e.g. a client within a peer-to-peer network such as Gnutella), the user will issue a request via the client software (for example, a peer-to-peer client, file system, etc.). The node where the request is generated is known as the requestor. The request is routed or broadcast along one or more paths along the network, and any node that possesses the desired object may respond. This node responds to the requesting node with the object either directly or through the request path. This existing mechanism requires a user to explicitly issue requests for objects by name (e.g. happy_birthday.mp3). If a user wishes for a shared object that is similar to objects already retrieved, it is up to the user to employ a manual process of determining what objects are similar and then to search for those objects on the network.

There are many technologies for determining the amount of similarity among a set of files. One technique is to fingerprint each file (e.g. with Rabin fingerprints) and match m of n fingerprints to determine a degree of similarity. So far, this work has been done only for static file sets. In addition, there are many products that determine whether two audio files are similar by looking at the encoding. These techniques will look at tempo and style.

There are systems that provide a means for automatically downloading music files. For example, there are systems that use an agent, which waits for a file to become available at a central server or peer node. The system requires a user to specify the filename and has the limitation that it cannot take into consideration variations in file names. In addition, it does not include any means for finding similar objects.

Many e-commerce Web sites will offer "similar" products to customers. For example, as a customer adds product Y to their shopping cart, the Web page may have some text "Those that bought Y also liked X and Z." The process of correlating products is either a manual process, or an automated process tracking buying habits. Neither of these actually compares using the contents of the products.

SUMMARY OF THE INVENTION

An exemplary embodiment of the present invention includes a method for sharing objects within a network of devices. The method steps comprising initiating a query for a query object on a first device connected to a network of devices. Finding a similar object similar to the query object on a second device connected to the network of devices, wherein the similarity is automatically judged by any device on the network. Transferring the similar object from the second device to the first device.

Another exemplary embodiment includes the query object and the similar object being similar to each other if they are similar by a specified degree.

Another exemplary embodiment of the present invention includes the similarity is based on comparing one or more characteristics of the query object and the similar object.

Another exemplary embodiment of the present invention includes at least one the characteristics being a type of meta-data.

Another exemplary embodiment of the present invention includes at least one of the characteristics being at least one of an object specific type and an application specific type.

Another exemplary embodiment of the present invention includes the type of meta-data being at least one of an object size, an object name, a fingerprint of the entire object, and at least one fingerprint of at least one portion of the object.

Another exemplary embodiment of the present invention includes the fingerprint being one of a content-defined type, a hash type, and an audio type.

Another exemplary embodiment of the present invention includes the fingerprint being at least one of a Rabin fingerprint, a SHA-1 hash and a MD5 hash.

Another exemplary embodiment of the present invention includes at least one of the characteristics being a context of the query object and the similar object.

Another exemplary embodiment of the present invention includes the context being defined by at least a portion of objects on a storage device.

Another exemplary embodiment of the present invention includes the objects sharing the context are inferred to be similar.

Another exemplary embodiment of the present invention includes providing a blacklist of zero or more objects.

Another exemplary embodiment of the present invention includes the blacklist being at least one of an explicit type and an implicit type.

Another exemplary embodiment of the present invention includes the objects in the blacklist not found to be similar to the query object.

Another exemplary embodiment of the present invention includes a program storage device readable by machine, tangibly embodying a program of instructions executable by the machine to perform a method for sharing objects within a network of devices. The program steps comprising initiating a query for a query object on a first device connected to a network of devices. Finding a similar object similar to the query object on a second device connected to the network of devices, wherein the similarity is automatically judged by any device on the network. Transferring the similar object from the second device to the first device.

Another exemplary embodiment of the present invention includes a system for sharing similar objects within a network of computers. The system comprising one or more controllers in communication with each other. The system also comprising a first storage device, that stores zero or more objects, in communication with at least one of the one or more controllers, wherein each object has at least one characteristic. There also being a second storage device, that stores zero or more objects, in communication with at least one of the one or more controllers, wherein each object has at least one characteristic. The system also comprising the first and second storage devices each in communication with each other via the controllers in communication with the storage devices; wherein, the sharing of similar objects between storage devices in response to a query is facilitated by the controllers that judge the similarity.

Another exemplary embodiment of the present invention includes at least one of the controllers determines that the second storage device already contains one or more stored objects similar to one ore more stored objects stored in the first storage device. It also includes at least one of the controllers then transfers at least one of the similar stored objects in the first storage device to the second storage device.

Another exemplary embodiment of the present invention includes at least one of the controllers in communication with at least one of the storage devices initiates a query for a query object. It also includes at lest one of the controllers in communication with at least one of the storage devices finding a similar object similar to the queried object in the second storage device. At least one of the controllers transferring the similar object to the first storage device.

Another exemplary embodiment of the present invention includes a transfer with the first storage device by the second storage device is rejected if the second storage device has exceeded a bandwidth threshold.

Another exemplary embodiment of the present invention includes at least one blacklist associated with at least one of the storage devices where in objects listed in the blacklist may not be transferred to the storage device associated with the blacklist.

Another exemplary embodiment of the present invention includes at least one of the controllers ("requester") in communication with the first storage device initiating a query for a query object. It also includes at least one of the controllers ("responder") in communication with the second storage device receiving the query and responding by sending at least one characteristic about the query object to the requester. The requester determining if the first storage device has similar objects, if so it sending a list of those objects to the responder. The responder deciding whether to accept or reject the transaction. If the transaction is accepted then a duplex transfer of the objects occurs between the requestor and the responder wherein the requestor receives the original object requested from the responder and the responder receives at least one of the similar objects from the requestor.

Another exemplary embodiment of the present invention includes wherein the initiated query further comprises an indicator for an acceptable degree of similarity.

DETAILED DESCRIPTION OF EXEMPLARY EMBODIMENTS

Figure 1:
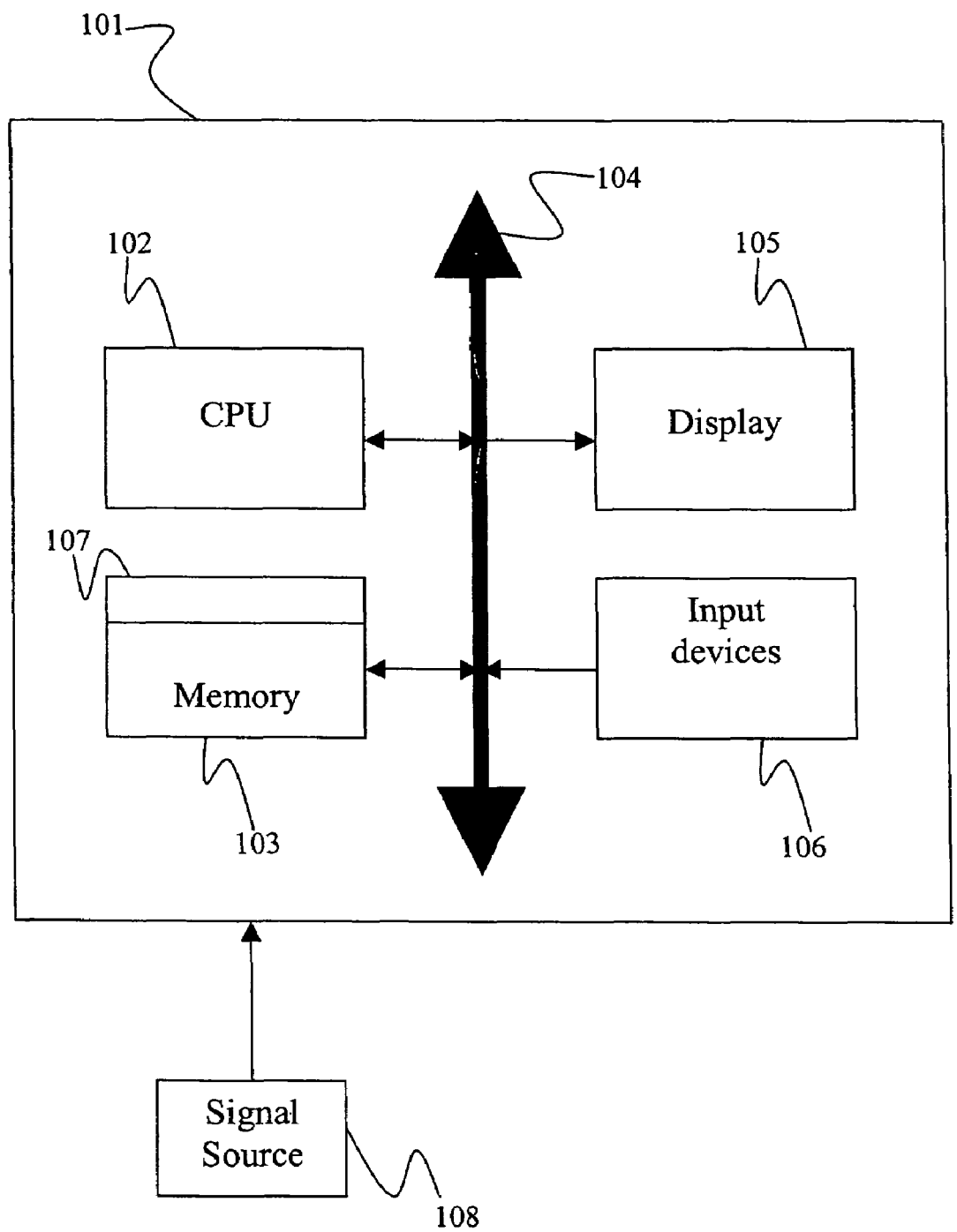
FIG. 1 is a schematic diagram illustrating an exemplary embodiment of a computer system.

Referring to FIG. 1, according to an exemplary embodiment of the present invention, a computer system 101 for implementing the present invention includes a central processing unit ("CPU") 102, a memory 103 and an input/output ("I/O") interface 104. The computer system 101 is generally coupled through the I/O interface 104 to a display 105 and various input devices 106 such as a mouse, keyboard, and medical imaging devices. The support circuits can include circuits such as cache, power supplies, clock circuits, and a communications bus. The memory 103 can include random access memory ("RAM"), read only memory ("ROM"), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer system 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

Figure 2:
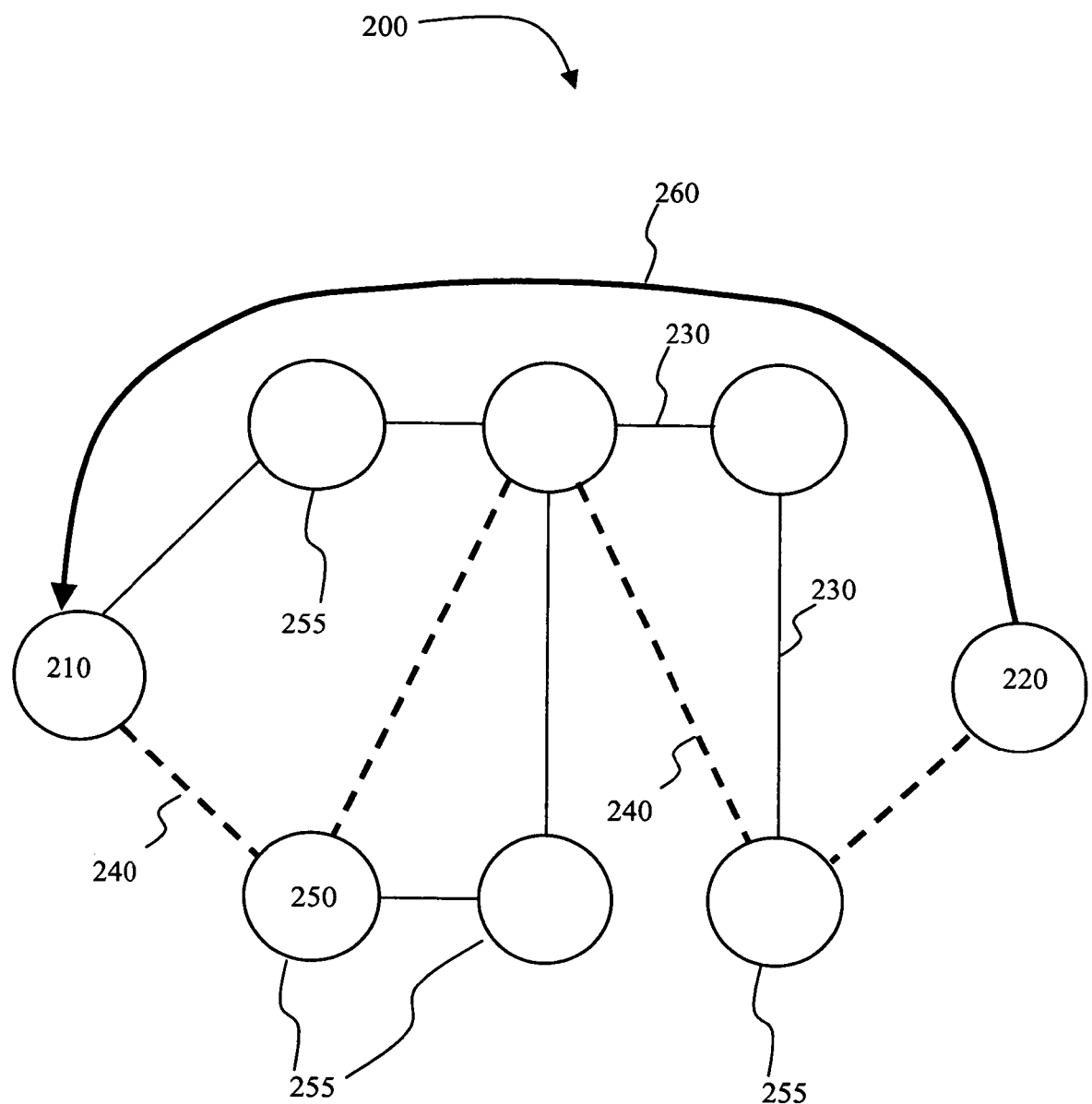
FIG. 2 is a schematic diagram illustrating an example of a network of nodes in which an exemplary embodiment of the present invention may be implemented.

FIG. 2 depicts a set of networked nodes 255 in accordance with an exemplary embodiment of the present invention and is indicated generally by reference numeral 200. In this example, the nodes, represented generally by reference numeral 255, can represent a set of networked computers. The nodes 255 can also represent separate controller and storage devices in a number of configurations. The network 200, as represented by connecting lines 230 and 240, comprises of computers 210, 250, 220 and other devices 255. Here, a user can obtain a shared object (e.g. a file) from an unknown location on the network. The user issues a request, via client software (for example, a peer-to-peer client, file system, etc.), at node 210, which is known as the requester. The request is routed or broadcast along one or more paths 240 and any node 255 that possesses the desired object may respond, in this case node 220. This node 220 may respond to the requesting node 210 with the object either directly via path 260, through the request path 240, or any other path through the network.

An exemplary embodiment of the present invention automatically finds new, similar content for the user with minimal, if any, intervention from the user. Not only can objects be discovered that the user would not have thought or known about, but the invention also provides a more efficient use of the user's bandwidth because fruitless user searches can be eliminated.

In an exemplary embodiment of the invention, any number of techniques can be used to determine if two objects are similar. As an example similarity between two objects can be inferred by comparing two or more users' object sets. For example, if two users have n % of the same files, then it can be inferred that each user may be interested the remainder of the other's files or a subset thereof.

In other exemplary embodiments of the present invention, meta-data, or data about an object, can be used to determine similarity. Objects with similar names, types, etc. may be considered similar depending on the object. Computed fingerprints, another type of meta-data, (e.g. Rabin fingerprints, SHA-1 hashes, or audio fingerprints for audio files) can be computed for each object, and then these fingerprints can be compared. If, for example, object a and object b match m out of n Rabin fingerprints taken for n portions of object a and b, then they can be considered similar. Other characteristics may be used as well.

In another exemplary embodiment of the present invention the characteristics of an object can be broken into different types. Two of those types object specific and application specific. Object specific characterizes are characteristics that can be applied to objects regardless of what type of object they are. These include but are not limited to object size and object name. Application specific characteristics are characteristics that can be applied to specific types of objects like, but not limited to, audio files, video files and image files, text files. An example of an application specific characteristic is the amount of a specific set of colors, like flesh tones, that may be found in images.

In other exemplary embodiments of the present invention the user or client can specify the degree of similarity desired. The user or client may adjust the degree of similarity for any reason, including, but not limited to, if too large a number of similar objects are received. Additionally, they can specify a bandwidth cap to ensure quality of service for other applications. This bandwidth cap may also be factored into the degree of similarity. As an other example to one client, classical music and opera music may be considered similar; however, to another, they may not depending on the degree of similarity that is set and the similarity algorithm used.

In other exemplary embodiments of the present invention, there are explicit and implicit mechanisms for blacklisting an object. A blacklisted object is one the user may not want. A user can explicitly tell the client program not to retrieve or receive (in case of a push) objects matching certain meta-data (e.g. do not download any songs by a particular opera singer). An implicit blacklist can occur if a user never accesses an object that has been received or if the user deletes an object that has been received. The client software can then adjust the similarity and/or degree of similarity accordingly.

Figure 3:
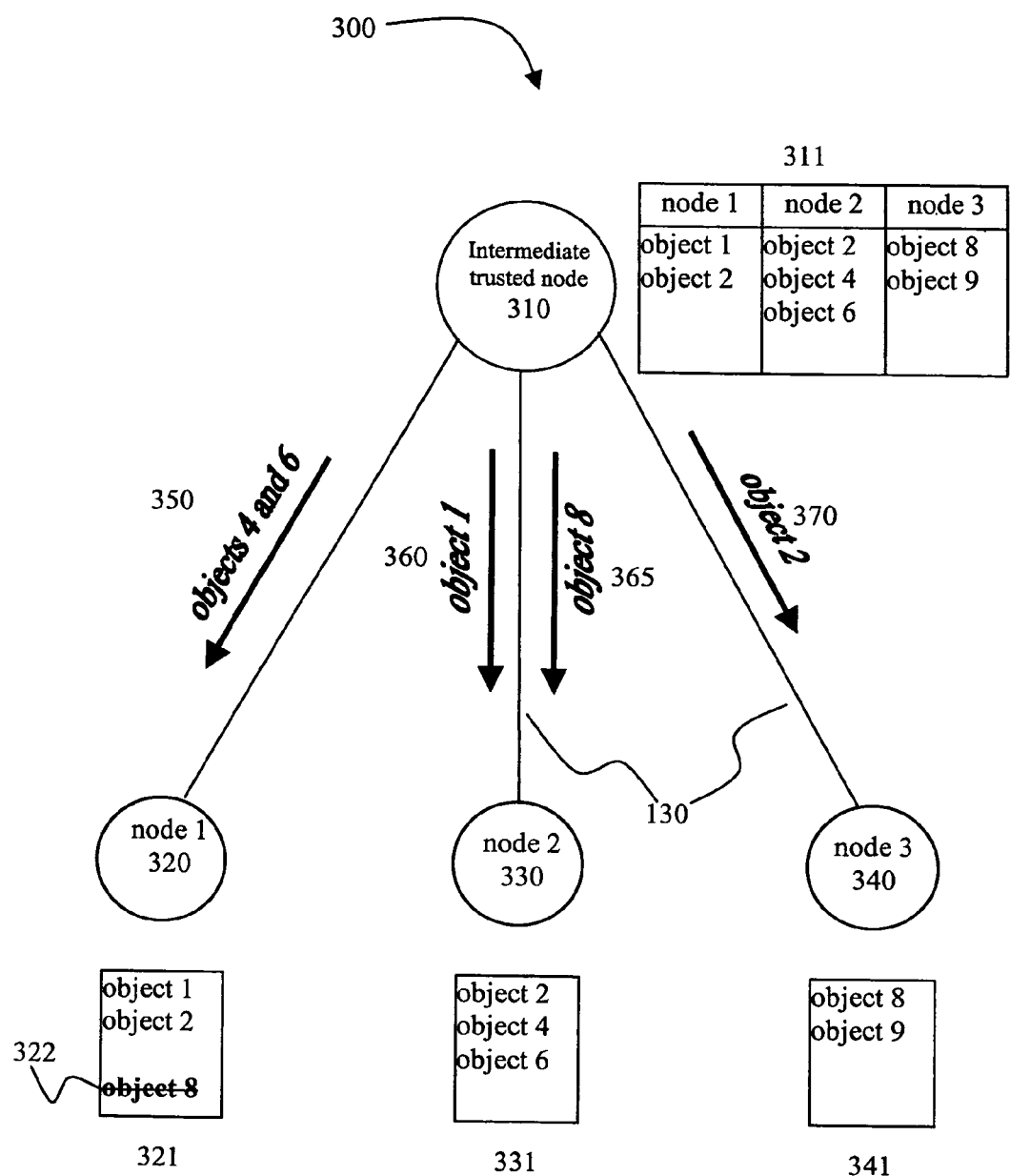
FIG. 3 is a schematic diagram illustrating a network with an intermediate node pushing objects to other nodes in accordance with an exemplary embodiment of the present invention.

FIG. 3 depicts a scenario in accordance with an exemplary embodiment of the present invention and is indicated generally by reference numeral 300. In the figure, intermediate node 310 pushes shared objects 350, 360 and 370 to other nodes 320, 330 and 340. The intermediate node 310 is a node inside of an object-sharing network that is known to be trusted, and when employed in certain networks, client nodes 320, 330 and 340 can be connected to the network 230 via the intermediate node 310. The intermediate node 310 has full knowledge, as represented by chart 311, of the object sets 321, 331 and 341 located at each of its respective connected clients 320, 330 and 340. For example, node 1 320 has two objects, object 1 324 and object 2 323 in its object listing 321. In addition, object 8 322 has been blacklisted by the user or the client software. The intermediate node 310 determines objects 1, 4 and 6 are similar. This similarity can be determined using any number of means, two examples of which are discussed below.

One example of how similarity can be determined in accordance with the present invention is that both nodes 1 and 2 (320 and 330) have object 2 (323 and 334). As the two nodes 1 and 2 (320 and 330) contain similar or the same objects, in this case they both contain object 2, it can be said that nodes 1 and 2 (320 and 330) contain objects that have a similar context. The degree of this similarity can go up as the number of similar (or the same) objects in two nodes increases. As nodes 1 and 2 (320 and 330) contain objects of a similar context the intermediate node 310 can push objects 4 and 6, indicated by reference numeral 350, to node 1 320 and push object 1, indicated by reference numeral 360, to node 2 320.

In another example of how similarity can be determined in accordance with the present invention, the intermediate node 310 determines that objects 2 and 8 are similar. In this case node 310 uses a meta-data matching algorithm to compare the meta-data, not pictured, associated with each object. However, in this case, the remainders of the objects in the two nodes are not found to be similar based on context. Thus, Object 2 is pushed, as indicated by reference numeral 370, to node 3 341; similarly Object 8 343 is pushed, as indicated by reference numeral 365, to node 2 330; however, since node 1 321 has blacklisted object 8 322, no object is pushed to node 1 320. Using this mechanism, similar objects can be pushed to clients. As clients acquire more objects, those objects may be shared with other users that may be interested in acquiring them.

In another exemplary embodiment of the present invention, the intermediate node could also be an adjacent peer node, also known as neighbor nodes, in which object lists are shared.

Figure 4:
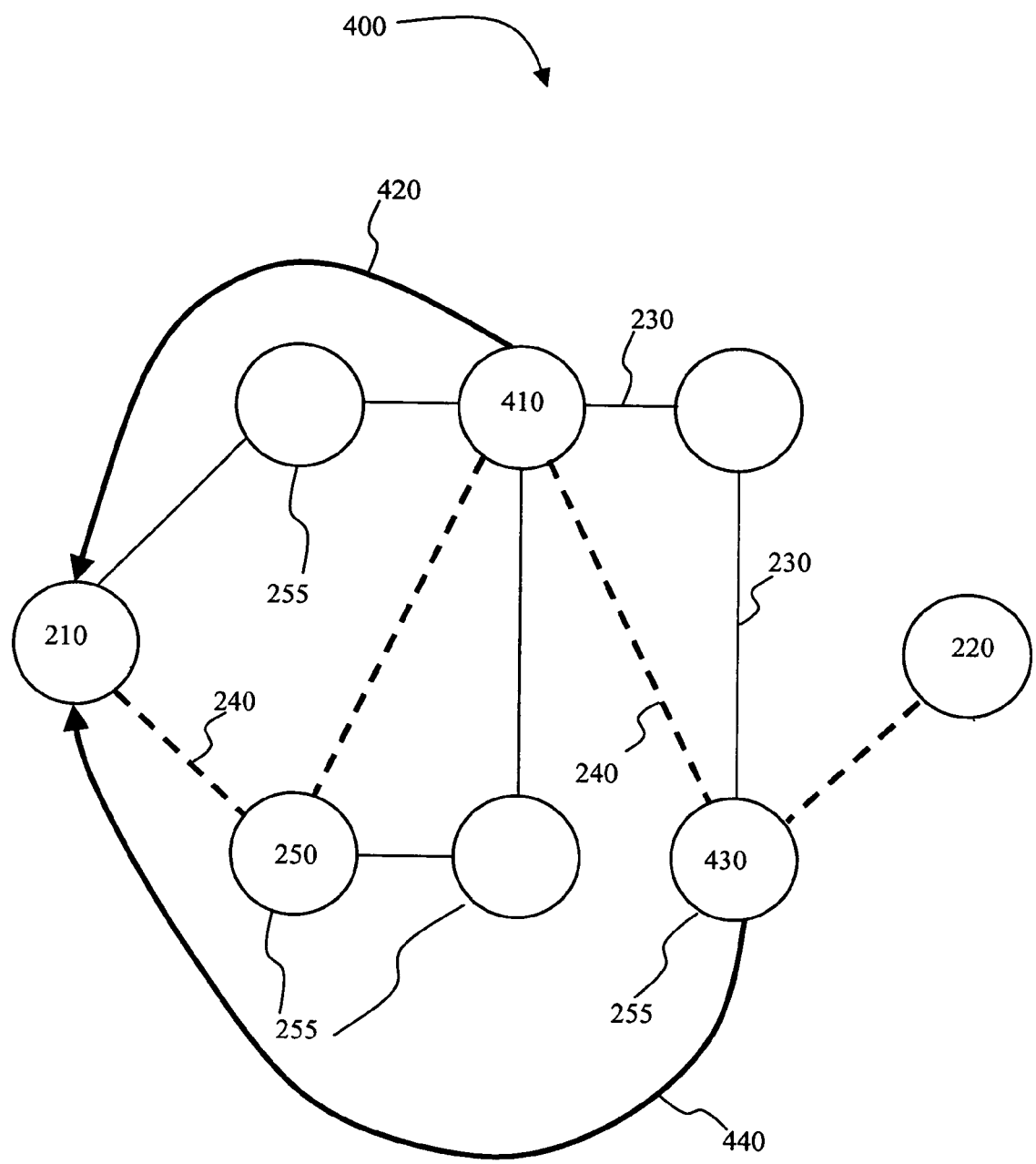
FIG. 4 is a schematic diagram illustrating a network of data processing systems with objects pushed from nodes on a request path, in accordance with an exemplary embodiment of the present invention.

FIG. 4 depicts another exemplary embodiment of the present invention. In network configurations without intermediate nodes, other client nodes may push objects as displayed. Network 200 from FIG. 2 is used to illustrate this example and is indicated generally by reference numeral 400. As a query for an object on the network 200 travels one or more paths 240, those nodes 255 forwarding the query can inspect their own object set for similar objects. If shared objects that are similar are found, then those nodes, 410 and 430 for example, can transfer those similar shared objects to the client 210 via direct paths 420 and 440. If the client node 210 has blacklisted a shared object, offered by nodes 410 or 430, then the client 210 can reject the transfer before it starts. The nodes 410 and 430 may, automatically or via manual intervention, fine-tune their similarity algorithms. For example after a number of searches a node might lower its similarity threshold, if it has transferred little or no objects. The similarity threshold, also knows as the degree of similarity herein, is the threshold at which, or degree to which, two objects are said to be similar. This threshold can be different for each algorithm used by the node or can be some aggregate of one ore more of those algorithms.

In other exemplary embodiments of the present invention, the query from node 210 can include the desired degree of similarity. Each node along the path 240 can employ a different similarity checking technique. In addition, the query can contain a maximum number of responses for similar objects desired by the client. As a node along the path responds to the query with similar objects, it could reduce this number by one before forwarding the request to the next node on the path. If this maximum is zero, then a node with similar objects might not respond.

Figure 5:
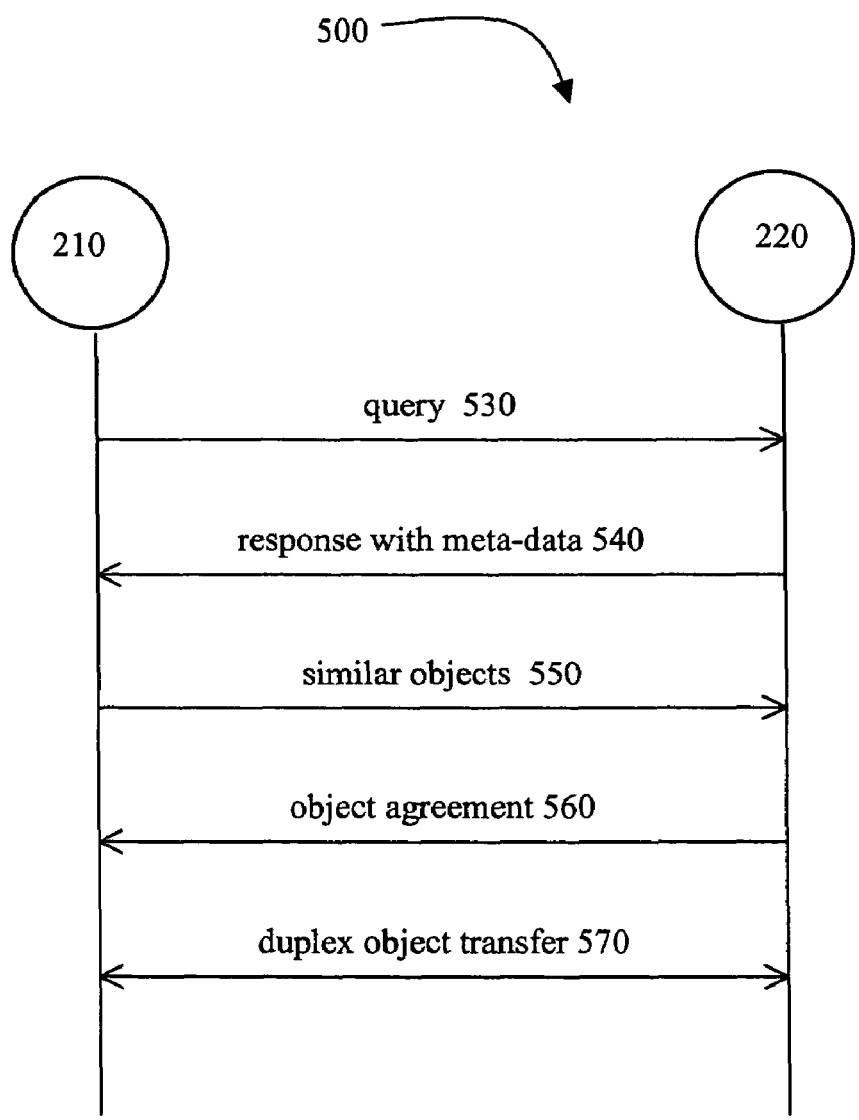
FIG. 5 is a sequence diagram illustrating an exemplary embodiment of a duplex transfer in accordance with the present invention.

FIG. 5 depicts another scenario for retrieving similar objects in accordance with the present invention and is indicated generally by reference numeral 500. A query 530 for an object is issued from the requestor 210. A node 220, known as the responder in this case, possesses the desired shared object (not shown). The responder 220 sends meta-data 540 about the object to the requester 210. The requestor automatically inspects its object set (not shown) to determine if it has one or more similar objects. If so, a response 550 is generated containing the list of similar objects (not shown). The responder 220 can accept 560 or reject the transaction at this point. If the transaction is accepted 560, then both parties begin the object transfer 570. The requestor 210 receives the object it wanted while the responder 220 receives one or more similar objects. This type of mechanism rewards those who participate in the sharing of objects, and it allows clients to reject requests for requesters with nothing to offer (known as leaches in the art).

Figure 6:
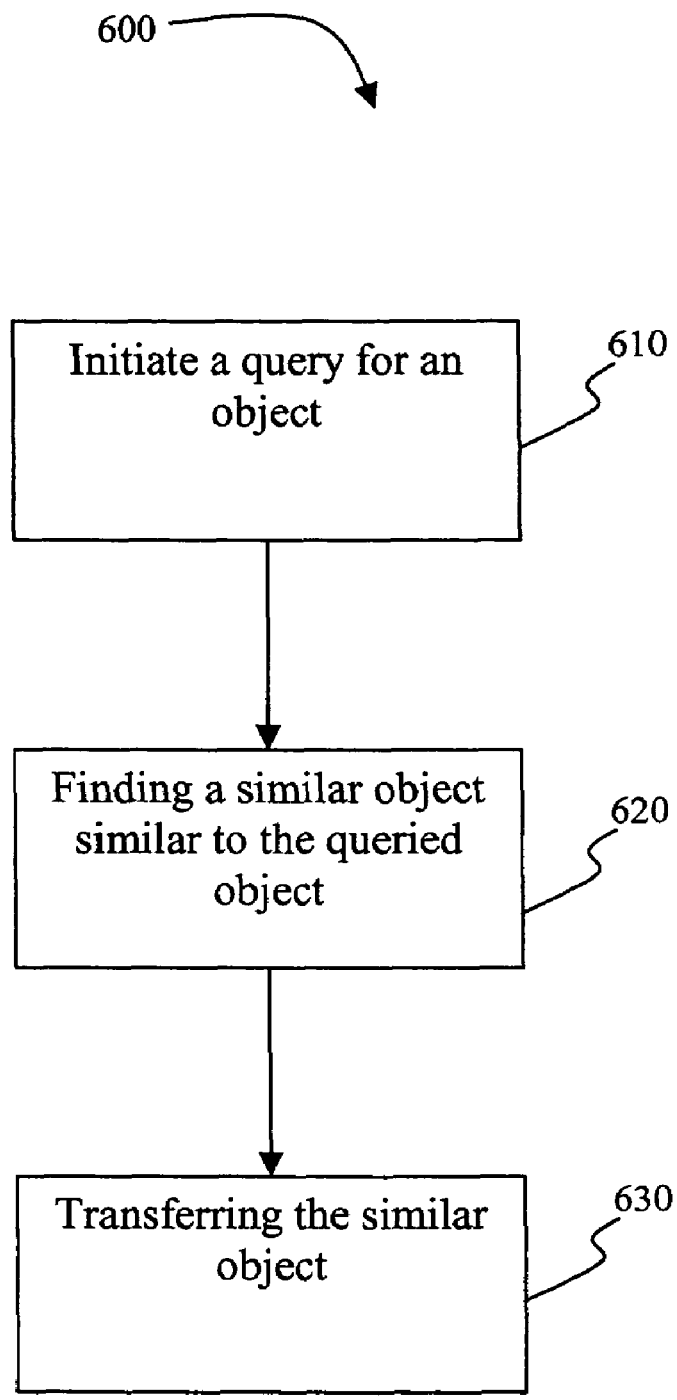
FIG. 6 is flow diagram depicting a method for automatic retrieval of similar objects in accordance of an exemplary embodiment of the present invention.

FIG. 6 is a flowchart depicting of an exemplary embodiment of the present invention and is indicated generally by reference numeral 600. It depicts a method for acquiring similar objects within a network of computers. Block 610 represents the step of a first controller initiating a query for an object. Block 620 represents the step of a second controller finding an object similar to the queried object stored in the storage unit in communication with the second controller. Block 630 depicts the step of transferring the similar object from the second storage device to the first storage device.

In another exemplary embodiment of the present invention, the client program can automatically issue a search based on meta-data or some other characteristic on behalf of the user. If a node has a similar object, then it can respond as described herein.

Figure 7:
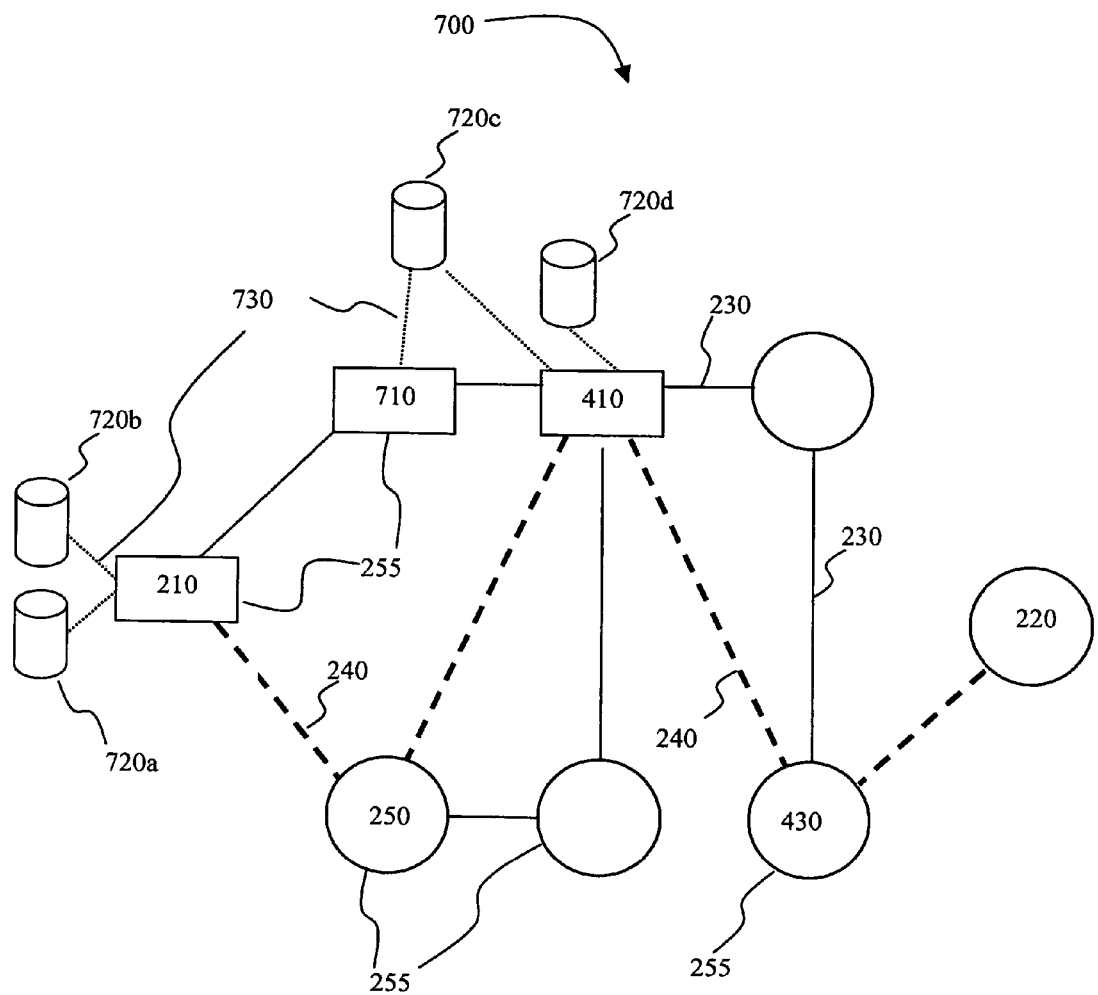
FIG. 7 is a schematic diagram illustrating of a network in accordance with an exemplary embodiment the present invention.

FIG. 7 depicts several other exemplary embodiments of the present invention. Here the network of nodes 400 depicted in FIG. 4 and is indicated generally by reference numeral 700. In this example a generic node 255, node 210 and node 410 have been replaced by respective controllers 710, 210' and 410'. Storage devices 720a-720d are in communications with the controllers 710, 210' and 410' via communication means 730. The controllers 710, 210' and 410' are in communication with each other and the other nodes in the network. A controller may be connected to one or more storages devices. Also, more than one controller may be connected to the same storage device as is the case with storage device 720c, with each controller 710 and 410' can (though it does not have to) use a different search algorithm to find objects similar to a query. The controller and storage device may be combined into one device as is the case with a computer whose hard rive is made available over a network. The controller can be a computer that connects to another stand-alone mass storage device. Other examples include a digital camera, which can be connected to the network directly or via a computer. Another example can be a cell phone that is connected to the network via a cell connection. In this example, the cell phone can act both as the controller and the storage device. A node can also comprise any number of media capture, storage and play back devices, like digital media players such as mp3 players, that can be connected to the network via a computer or directly. The controller to controller and controller to storage device connections may be implemented using physical wired connections or wireless connections as is the case of a cell phone.

It is to be understood that the embodiments of present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. For the convenience of the reader, the above description has focused on a representative sample of possible embodiments, that are illustrative of the principles of the invention, and has not attempted to exhaustively enumerate all possible variations. That alternative embodiments may not have been presented for a specific portion of the invention is not to be considered a disclaimer of those alternate embodiments. Other applications and embodiments can be straightforwardly implemented without departing from the spirit and scope of the present invention. It is therefore intended, that the invention not be limited to the specifically described embodiments, but the invention is to be defined in accordance with that claims that follow. It can be appreciated that many of those undescribed embodiments are within the literal scope of the following claims, and that others are equivalent.

What is claimed is:

1. A program storage device readable by computer, tangibly embodying a program of instructions executable by the computer to perform method steps for sharing objects in a network, the method steps comprising:

a responding client node receiving a query for a query object initiated by a requesting client node in a network of client nodes;

the responding client node automatically determining if an object, which resides on the responding client node, is similar to the query object;

transferring one or more similar objects, if any, to the requesting client node by the responding client node; and the responding client node forwarding the query to another client node to search for an object similar to the query object, and wherein at least one of the responding client node and the another client node can automatically fine tune similarity algorithms the resounding client node and the another client node contain for changing a similarity threshold for determining the similarity between objects in the network, and wherein the similarity threshold can be different for each similarity algorithm of each of the client nodes or the similarity threshold can be an aggregate of one or more of these similarity algorithms used by the client nodes.

2. The program storage device of claim 1, wherein the fine tuning of the similarity algorithms by at least one of the responding client node and the another client node includes lowering the threshold similarity used for determining the similarity between objects in the network.

3. The program storage device of claim 2, wherein the threshold similarity for determining the similarity between the objects in the network is lowered if relatively little or no objects have been transferred after a number of searches have been performed.

4. The program storage device of claim 1, further comprises providing a blacklist mechanism for preventing receipt or retrieval of an object a user in the network may not want.

5. The program storage device of claim 4, wherein the blacklist mechanism is an implicit blacklist mechanism.

6. The program storage device of claim 4, wherein the implicit blacklist mechanism is activated when a user in the network system either never accesses an object that has been received or if the user deletes an object that has been received.

7. A system for sharing similar objects within a network comprising:

a plurality of controllers in communication with each other over a network; and a first storage device and a second storage device, which stores objects that can be shared between the first and second storage devices under control of the controllers, wherein the controllers control sharing of similar objects between the first and second storage devices by processing an object query issued by a requesting controller and automatically determining if a stored object in the first or second storage device is similar to a queried object and, wherein the plurality of controllers can each automatically fine tune similarity algorithms the plurality of controllers contain for changing a similarity threshold for determining the similarity between objects in the network, wherein the fine tuning of the similarity algorithms by the plurality of controllers includes lowering the threshold similarity used for determining the similarity between objects in the network, and wherein the threshold similarity for determining the similarity between the objects in the network is lowered if relatively little or no objects have been transferred after a number of searches has been performed.

8. The system of claim 7, further comprising a blacklist mechanism associated with at least one of the storage devices wherein an object determined to part of the blacklist mechanism may not be transferred to the storage devices associated with the blacklist mechanism.

9. The system of claim 8, wherein the blacklist mechanism is an implicit blacklist mechanism.

10. The system of claim 9, wherein the implicit blacklist mechanism is activated when a user in the network system either never accesses an object that has been received or if the user deletes an object that has been received.

11. The program storage device of claim 7, wherein the similarity threshold can be different for each similarity algorithm of each of the client nodes or the similarity threshold can be an aggregate of one or more of these similarity algorithms used by the client nodes.

12. The system of claim 7, wherein the plurality of controllers comprise at least one of a computer, digital camera, cellular phone and digital media player.

* * * * *